United States Patent
Kimura et al.

(10) Patent No.: US 9,817,200 B2
(45) Date of Patent: Nov. 14, 2017

(54) OPTICAL FIBER CABLE AND SENSOR

(71) Applicant: Mitsubishi Rayon Co., Ltd., Chiyoda-ku, Tokyo (JP)

(72) Inventors: Tsuyoshi Kimura, Toyama (JP); Yoshihiro Tsukamoto, Toyama (JP); Kouji Asano, Toyama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/111,577

(22) PCT Filed: Jan. 13, 2015

(86) PCT No.: PCT/JP2015/050573
§ 371 (c)(1),
(2) Date: Jul. 14, 2016

(87) PCT Pub. No.: WO2015/108010
PCT Pub. Date: Jul. 23, 2015

(65) Prior Publication Data
US 2016/0334595 A1   Nov. 17, 2016

(30) Foreign Application Priority Data

Jan. 17, 2014 (JP) ................. 2014-007000

(51) Int. Cl.
*G02B 6/44* (2006.01)
*G02B 6/02* (2006.01)
*C03C 25/10* (2006.01)
*C03C 25/30* (2006.01)

(52) U.S. Cl.
CPC ............ *G02B 6/443* (2013.01); *C03C 25/106* (2013.01); *C03C 25/1065* (2013.01); *C03C 25/30* (2013.01); *G02B 6/02033* (2013.01); *G02B 6/4436* (2013.01)

(58) Field of Classification Search
CPC ..................................... G02B 6/4436
See application file for complete search history.

(56) References Cited

U.S. PATENT DOCUMENTS

| | | | | |
|---|---|---|---|---|
| 4,844,578 A | * | 7/1989 | Pierini | G02B 6/443 |
| | | | | 385/128 |
| 2001/0016627 A1 | * | 8/2001 | Koshirai | C08L 23/02 |
| | | | | 525/192 |
| 2012/0128906 A1 | * | 5/2012 | Jackson | C08F 8/42 |
| | | | | 428/35.1 |

FOREIGN PATENT DOCUMENTS

| | | |
|---|---|---|
| JP | H01-319004 A | 12/1989 |
| JP | H03-100610 A | 4/1991 |
| JP | 2003-139972 | 5/2003 |

(Continued)

OTHER PUBLICATIONS

International Search Report issued in corresponding International Patent Application No. PCT/JP2015/050573 dated Mar. 17, 2015.

*Primary Examiner* — Omar R Rojas
(74) *Attorney, Agent, or Firm* — Morgan, Lewis & Bockius LLP (57) ABSTRACT

Provided is an optical fiber cable having excellent flame retardancy, long-term heat resistance and mechanical characteristics. An optical fiber cable according to the present invention comprises an optical fiber and a cladding layer that is provided on the outer circumference of the optical fiber. The cladding layer contains a chlorinated polyolefin resin (A) and a polyolefin resin (B).

16 Claims, 1 Drawing Sheet (56) References Cited

FOREIGN PATENT DOCUMENTS

WO 2011/121826 A1 10/2011
WO 2012/173190 A1 12/2012

* cited by examiner

OPTICAL FIBER CABLE AND SENSOR

FIELD OF THE INVENTION

The present invention relates to an optical fiber cable and a sensor.

BACKGROUND ART

Optical fibers are used in a wide variety of applications such as communication equipment, sensors, lighting, ornamentation, and displays. Glass optical fibers have excellent optical transmission properties in a wide range of wavelengths; however, their processability and mechanical characteristics are not so excellent. By contrast, plastic optical fibers are structured, for example, by coating the outer periphery of a core made of a highly transparent resin such as polymethyl methacrylate with a highly transparent resin having a refractive index lower than that of the core. Compared with glass optical fibers, plastic optical fibers are excellent in processability, flexibility and the like. Moreover, the transmission distance of plastic optical fibers has been further extended by the improvement of production technologies in recent years, and their application range is being expanded.

Generally speaking, optical fibers are not used by themselves, but are usually used as optical fiber cables, which are formed by coating optical fibers with thermoplastic resins or the like to provide mechanical characteristics, flame retardancy, heat resistance and so forth. Especially, since regulations on flame retardant properties of plastic products have become stricter recently, optical fiber cables are required to have excellent flame retardancy.

To provide flame retardant properties for optical fibers, Patent Literature 1, for example, proposes optical fiber cables formed by coating chlorinated polyethylene on plastic optical fibers.

PRIOR ART LITERATURE

Patent Literature

Patent Literature 1: JPH3-100610A

SUMMARY OF THE INVENTION

Problems to be Solved by the Invention

However, optical fiber cables proposed in Patent Literature 1 do not exhibit sufficient long-term heat resistance and mechanical characteristics despite improved flame retardancy. Thus, further improvements are anticipated.

Accordingly, the objective of the present invention is to provide optical fiber cables that are excellent in flame retardancy, long-term heat resistance and mechanical characteristics.

Solutions to the Problems

The present invention is described in [1]~[10] below.

[1] An optical fiber cable having an optical fiber and a jacket layer formed on the periphery of the optical fiber, and the jacket layer contains chlorinated polyolefin resin (A) and polyolefin resin (B).

[2] The optical fiber cable described in [1], in which the flexural modulus of the optical fiber cable is 3~10 N when measured by conducting a three-point bending test in accordance with ISO 178.

[3] The optical fiber cable described in [1] or [2], in which the jacket layer further contains a melt tension improver (J).

[4] The optical fiber cable described in [3], in which the melt tension improver (J) is at least either an acrylic resin melt tension improver or a fluororesin melt tension improver.

[5] The optical fiber cable described in any of [1]~[4], in which the number of repeated bendings of the optical fiber cable is 30000~70000 when measured by conducting a repeated bending test in accordance with IEC 60794-1:1993.

[6] The optical fiber cable described in any of [1]~[5], in which chlorinated polyolefin resin (A) is chlorinated polyethylene.

[7] The optical fiber cable described in any of [1]~[6], in which polyolefin resin (B) is polyethylene.

[8] The optical fiber cable described in any of [1]~[7], in which the jacket layer further contains a flame retardant (C).

[9] The optical fiber cable described in [8], in which the jacket layer further contains a flame retardant promoter (D).

[10] A sensor containing the optical fiber cable described in any of [1]~[9].

Effects of the Invention

According to the present invention, optical fiber cables are provided with excellent flame retardancy, long-term heat resistance and mechanical characteristics.

BRIEF DESCRIPTION OF THE DRAWINGS

FIG. 1 (a) and FIG. 1 (b) schematically shows cross-sectional views of optical fiber cables related to the present invention;

FIG. 2 (a) and FIG. 2 (b) schematically shows cross-sectional views of step-index optical fibers as examples of optical fiber in the optical fiber cable related to the present invention.

MODE TO CARRY OUT THE INVENTION

In the following, embodiments of the present invention are described by referring to the accompanying drawings. However, the present invention is not limited to those shown in the drawings.

[Optical Fiber Cable]

Figure 1:
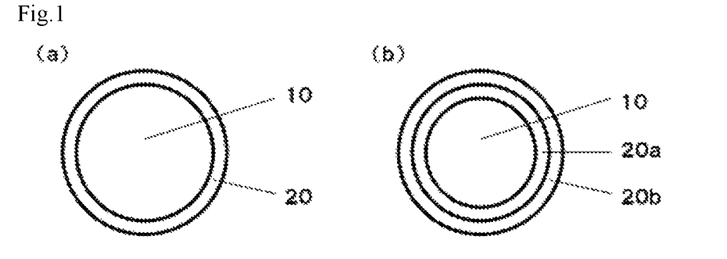

An optical fiber cable related to the present invention is structured to have an optical fiber and a jacket layer formed on the periphery of the optical fiber. Optical fiber cables related to the present invention are, for example, an optical fiber cable having one jacket layer 10 formed on the periphery of optical fiber 10 as shown in FIG. 1(a), and an optical fiber cable having two jacket layers 20a, 20b formed on the periphery of optical fiber 10 as shown in FIG. 1(b). The number of jacket layers may be one or two or more.

(Optical Fiber)

Optical fibers are not limited specifically as long as they function as optical fibers, and any known optical fibers may be used. Examples are step-index optical fibers, multistep-index optical fibers, graded-index optical fibers, multicore optical fibers and the like. Among those, step-index optical fibers and multicore optical fibers are preferred because of their excellent heat resistance, and step-index optical fibers are more preferred because of their longer transmission capabilities.

Figure 2:
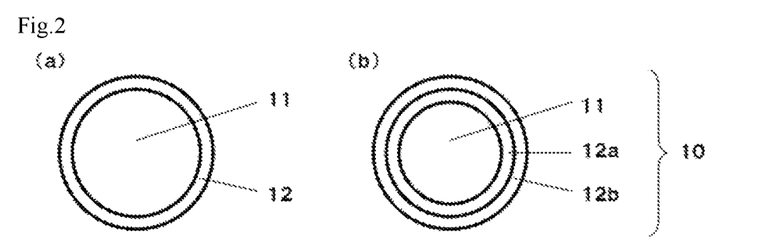

In a step-index optical fiber, total reflection of light occurs at the interface of the core and the cladding, and the light propagates through the core. Examples of a step-index optical fiber are a type having core 11 and one layer of cladding 12 on the periphery of core 11 as shown in FIG. 2(a); another type having core 11 and two cladding layers 12a, 12b on the periphery of core 11 shown in FIG. 2(b); and the like. The number of cladding layers may be one or two or greater.

(Core)

The material for forming a core (core material) is not limited specifically as long as it is highly transparent, and may be appropriately selected according to usage purposes or the like. Examples of highly transparent material are glass and resins such as acrylic resins, styrene resins and carbonate resins. Such highly transparent materials may be used alone or in combination thereof. Among those highly transparent materials, resins are preferred since, despite their low flame retardancy and long-term heat resistance properties, resins exhibit excellent effects when coated with jacket layers related to the present invention. Thus, resins are preferred for core material among the materials listed above. Acrylic resins are more preferred since they are capable of further extending transmission distance.

Examples of acrylic resins are methyl methacrylate homopolymers, copolymers containing at least 50 mass % of a methyl methacrylate unit, and the like. They may be used alone or in combination thereof. Among them, because of excellent optical and mechanical characteristics, heat resistance, and transparent properties, methyl methacrylate homopolymers and copolymers containing at least 50 mass % of a methyl methacrylate unit are preferred, more preferably methyl methacrylate homopolymers and copolymers containing at least 60 mass % of a methyl methacrylate unit, even more preferably methyl methacrylate homopolymers and copolymers containing at least 70 mass % of a methyl methacrylate unit, especially preferably methyl methacrylate homopolymers.

As for a method for producing a core material, bulk polymerization, suspension polymerization, emulsion polymerization, solution polymerization or the like, for example, is employed. Among them, bulk polymerization and solution polymerization are preferred, since impurities are suppressed from being mixed in.

(Cladding)

A cladding is formed on the periphery of a core. The cladding may be one layer as shown in FIG. 2(a), two layers as shown in FIG. 2(b), or three or more layers. The material for forming a cladding (cladding material) is not limited specifically as long as it has a refractive index lower than that of the core. Cladding material may be appropriately selected according to the composition of the core material, usage purposes and the like. When acrylic resin is used as core material, fluororesin is preferred to be used as the cladding material since transmission loss is lowered. Especially, when methyl methacrylate homopolymers or copolymers containing at least 50 mass % of a methyl methacrylate unit are used as core material, fluororesin is preferred to be used as cladding material since transmission loss is lowered.

Examples of fluororesin are vinylidene fluoride (VDF) homopolymers, VDF-trifluoroethylene copolymers, VDF-tetrafluoroethylene (TFE) copolymers, VDF-hexafluoropropylene (HFP) copolymers, VDF-TFE-HFP copolymers, VDF-TFE-HFP-(perfluoro)alkyl vinyl ether copolymers, VDF-hexafluoroacetone copolymers, VDF-TFE-hexafluoroacetone copolymers, ethylene-VDF-TFE-HFP copolymers, ethylene-TFE-HFP copolymers, fluoroalkyl (meth)acrylate polymers, fluoroalkyl (meth)acrylate-alkyl (meth)acrylate copolymers, and the like. Those fluororesins may be used alone or in combination thereof. In the present application, (meth)acrylate indicates acrylate or methacrylate.

Among the fluororesins listed above, VDF-TFE copolymers, VDF-HEP copolymers, VDF-TFE-HFP copolymers, ethylene-VDF-TFE-HFP copolymers, ethylene-TFE-HFP copolymers, fluoroalkyl (meth)acrylate polymers, and fluoroalkyl (meth)acrylate-alkyl (meth)acrylate copolymers are preferred since they are reasonably priced, and have excellent flexibility, impact resistance, transparency and chemical resistance.

When an optical fiber is formed to have one cladding layer, it is preferred to select from among the following since they exhibit excellent chemical resistance: VDF-TFE copolymers, VDF-HEP copolymers, VDF-TFE-HFP copolymers, ethylene-VDF-TFE-HFP copolymers, ethylene-TFE-HFP copolymers, fluoroalkyl (meth)acrylate polymers, and fluoroalkyl (meth)acrylate-alkyl (meth)acrylate copolymers. Among them, VDF-TFE copolymers, VDF-HEP copolymers, VDF-TFE-HFP copolymers, ethylene-VDF-TFE-HFP copolymers, and ethylene-TFE-HFP copolymers are more preferred, since they exhibit excellent mechanical characteristics.

When an optical fiber is formed to have two cladding layers, to suppress leakage of light when the optical fiber is bent, the first layer (inner layer, cladding 12a in FIG. 2(b)) is preferred to be a fluoroalkyl (meth)acrylate polymer or a fluoroalkyl (meth)acrylate-alkyl (meth)acrylate copolymer, and the second layer (outer layer, cladding 12b in FIG. 2(b)) is preferred to be a VDF-TFE copolymer, VDF-HEP copolymer, VDF-TFE-HFP copolymer, ethylene-VDF-TFE-HFP copolymer, or ethylene-TFE-HFP copolymer.

Examples of fluoroalkyl (meth)acrylate are long-chain fluoroalkyl (meth)acrylate represented by formula (1) below such as 2-(perfluorohexyl)ethyl methacrylate (13FM) and 2-(perfluorooctyl)ethyl methacrylate (17FM); short-chain fluoroalkyl (meth)acrylate represented by formula (2) below such as 2,2,2-trifluoroethyl methacrylate (3FM).

[chemical formula 1]

(1)

(In formula (1), "m" is an integer of 1 or 2, "n" is an integer of 5-13, "R" indicates a hydrogen atom or a methyl group, and "X" indicates a hydrogen atom or fluorine atom.)

[chemical formula 2]

(2)

(In formula (2), "m" is an integer of 1 or 2, "n" is an integer of 1-4, "R" indicates a hydrogen atom or a methyl group, and "X" indicates a hydrogen atom or fluorine atom.)

Since fluoroalkyl (meth)acrylate polymers and fluoroalkyl (meth)acrylate-alkyl (meth)acrylate copolymers can reduce transmission loss, it is preferred to use a copolymer that contains 10~50 mass % of a long-chain fluoroalkyl (meth)

acrylate unit represented by formula (1) above, 20~90 mass % of a short-chain fluoroalkyl (meth)acrylate unit represented by formula (2) above, and 0~50 mass % of another copolymerizable monomer unit. Particularly preferred are 17FM-3FM-methylmethacrylate-methacrylic acid copolymers and 13FM-3FM-methyl methacrylate-methacrylic acid copolymers that satisfy the aforementioned ranges of content.

(Method for Producing Optical Fiber)

To produce an optical fiber, a melt-spinning method, for example, is employed. Step-index optical fibers and multicore optical fibers are produced, for example, by melting core material and cladding material, which are then subjected to conjugate spinning. When optical fiber cables are used under conditions that undergo significant temperature differences, optical fibers are preferred to be annealed to prevent pistoning. Conditions for annealing optical fibers may be selected appropriately according to the materials used for optical fibers. Annealing may be performed continuously or by batch.

The diameter of an optical fiber is preferred to be 0.1~5 mm, more preferably 0.2~4.5 mm, even more preferably 0.3~4 mm, because optical fibers of such a size are capable of reducing transmission loss and exhibiting excellent processability.

In view of coupling efficiency with optical devices and the tolerance to imperfect alignment of optical axes, the diameter of a core in a step-index optical fiber is preferred to be at least 85%, more preferably at least 90%, even more preferably at least 95%, of the diameter of the step-index optical fiber. The core diameter is set to be no greater than 99.99% of the diameter of the step-index optical fiber.

In a step-index optical fiber, the thickness of a cladding is preferred to be no greater than 15%, more preferably no greater than 10%, even more preferably no greater than 5%, of the diameter of the step-index optical fiber, considering coupling efficiency with optical devices and tolerance to imperfect alignment of optical axes. The thickness of a cladding is set to be at least 0.01% of the diameter of the step-index optical fiber.

When two cladding layers are formed, the first layer (inner layer, cladding 12a in FIG. 2(b)) and the second layer (outer layer, cladding 12b in FIG. 2(b)) may be set in any thickness ratio. When there are two cladding layers, the thickness ratio of the first and second layers (first layer versus second layer) is preferred to be 1:0.5~1:5, more preferably 1:1~1:4, even more preferably 1:1.2~1:3, since transmission loss is reduced if set in such a ratio.

The refractive indices of core and cladding materials are not limited specifically as long as the refractive index of cladding material is lower than that of core material. To reduce transmission loss, the refractive index of core material is preferred to be 1.45~1.55 while the refractive index of cladding material is set at 1.35~1.45; more preferably the refractive index is preferred to be 1.46~1.53 for core material and 1.37~1.44 for cladding material; even more preferably 1.47~1.51 for core material and 1.39~1.43 for cladding material. Here, refractive indices are measured at 20° C. by using sodium D lines.

(Jacket Layer)

A jacket layer contains chlorinated polyolefin resin (A) and polyolefin resin (B). In addition to chlorinated polyolefin resin (A) and polyolefin resin (B), a jacket layer may also contain flame retardant (C), flame retardant promoter (D), thermal stabilizer (E), antioxidant (F), lubricant (G), pigment (H), melt tension improver (J) and other additives (I).

A jacket layer may be single-layered as shown in FIG. 1(a), double-layered as shown in FIG. 1(b), or triple-layered or greater. When the jacket layer is double-layered or greater, the jacket layer related to the present invention containing chlorinated polyolefin resin (A) and polyolefin resin (B) is preferred to be the outermost layer of an optical fiber cable since it exhibits excellent flame retardancy.

(Chlorinated Polyolefin Resin (A))

Since chlorinated polyolefin resin exhibits excellent flame retardancy, the flame retardancy properties of an optical fiber cable are enhanced when the jacket layer contains chlorinated polyolefin resin (A).

Examples of chlorinated polyolefin resin (A) are chlorinated polyethylene resins such as chlorinated high-density polyethylene, chlorinated low-density polyethylene, and chlorinated straight-chain low-density polyethylene; chlorinated polypropylene; and resins obtained by chlorinating ethylene-propylene random copolymers and ethylene-propylene block copolymers. Those chlorinated polyolefin resins (A) may be used alone or in combination thereof. Among those listed above, chlorinated polyethylene is preferred, more preferably chlorinated high-density polyethylene, because they exhibit sufficient hardness when coated on an optical fiber so that the optical fiber cable achieves excellent mechanical characteristics.

The method for producing chlorinated polyolefin resin (A) is not limited specifically, as long as a polyolefin resin is chlorinated. An example is an aqueous suspension method: that is, a chlorine gas is blown into an aqueous suspension of polyolefin resin at a temperature near the melting point of polyolefin to carry out reactions. Among production methods of chlorinated polyolefin resin (A), aqueous suspension is preferred since chlorinated polyolefin resin (A) is efficiently produced.

In 100 mass % of chlorinated polyolefin resin (A), the content of chlorine (chlorination rate) is preferred to be 15~50 mass %, more preferably 20~45 mass %, even more preferably 25~40 mass %. When the content of chlorine of chlorinated polyolefin resin (A) is at least 15 mass %, the optical fiber cable exhibits excellent flame retardancy. When the content of chlorine in chlorinated polyolefin resin (A) is no greater than 50 mass %, elimination reactions of chlorine atoms are suppressed, and the optical fiber cable exhibits excellent long-term heat resistance.

The content of chlorinated polyolefin resin (A) in 100 mass % of a jacket layer is preferred to be 15~48 mass %, more preferably 18~45 mass %. When the content of chlorinated polyolefin resin (A) in a jacket layer is at least 15 mass %, the optical fiber cable exhibits excellent flame retardancy. When the content of chlorinated polyolefin resin (A) in the jacket layer is no greater than 48 mass %, the optical fiber cable exhibits excellent long-term heat resistance and mechanical characteristics.

(Polyolefin Resin (B))

Polyolefin resin (B) is capable of supplementing heat resistance and hardness that are insufficient properties in chlorinated polyolefin resin (A). When polyolefin resin (B) is contained in a jacket layer, long-term heat resistance and mechanical characteristics of the optical fiber cable are enhanced.

Examples of polyolefin resin (B) are polyethylene resins such as high-density polyethylene, low-density polyethylene, and straight-chain low-density polyethylene; polypropylene; ethylene-propylene random copolymers; ethylene-propylene block copolymers; and the like. Those examples of polyolefin resin (B) may be used alone or in combination thereof. Among those examples of polyolefin resin (B), polyethylene is preferred, more preferably high-density polyethylene, since they provide excellent mechanical characteristics and chemical resistance for the optical fiber cable.

In 100 mass % of a jacket layer, the content of polyolefin resin (B) is preferred to be 17~45 mass %, more preferably 20~40 mass %. When the content of polyolefin resin (B) in the jacket layer is at least 17 mass %, the optical fiber cable exhibits excellent long-term heat resistance and mechanical characteristics. When the content of polyolefin resin (B) in the jacket layer is no greater than 45 mass %, the optical fiber cable exhibits excellent flame retardancy.

(Chlorinated Polyolefin Resin (A)-Polyolefin Resin (B))

Chlorinated polyolefin resin (A) and polyolefin resin (B) are preferred to be compatible to exhibit sufficient flame retardancy and mechanical characteristics in an optical fiber cable. For chlorinated polyolefin resin (A) and polyolefin resin (B) to be compatible, the polyolefin resin of chlorinated polyolefin resin (A) prior to being chlorinated is preferred to be the same as polyolefin resin (B). In particular, when chlorinated polyolefin resin (A) is chlorinated polyethylene, polyolefin resin (B) is preferred to be polyethylene. Also, when chlorinated polyolefin resin (A) is chlorinated high-density polyethylene, polyolefin resin (B) is preferred to be high-density polyethylene.

Relative to 100 parts by mass of chlorinated polyolefin resin (A), the content of polyolefin resin (B) is preferred to be 20~250 parts by mass, more preferably 50~200 parts by mass. When the content of polyolefin resin (B) is at least 20 parts by mass relative to 100 parts by mass of chlorinated polyolefin resin (A), the optical fiber cable exhibits excellent long-term heat resistance and mechanical characteristics. In addition, when the content of polyolefin resin (B) is no greater than 250 parts by mass relative to 100 parts by mass of chlorinated polyolefin resin (A), the optical fiber cable exhibits excellent flame retardancy.

In 100 mass % of a jacket layer, the total content of chlorinated polyolefin resin (A) and polyolefin resin (B) is preferred to be at least 40 mass %, more preferably at least 50 mass %, even more preferably at least 55 mass %, to provide excellent mechanical characteristics for the optical fiber cable. The upper limit of the total content is not limited specifically; for example, the upper limit may be set at 80 mass % or less.

(Flame Retardant (C))

The jacket layer related to the present invention is preferred to further contain a flame retardant (C). Since flame retardant (C) provides excellent flame retardancy properties, when the jacket layer contains a flame retardant (C), the flame retardancy of the optical fiber cable is further enhanced.

Examples of a flame retardant (C) are halogen-based flame retardants such as bromine compounds and chlorine compounds; phosphorus-based flame retardants such as phosphorous, phosphate compounds and phosphate ester compounds; and so on. Those flame retardants (C) may be used alone or in combination thereof. Among those, halogen-based flame retardants are preferred since they exhibit excellent flame retardancy in an optical fiber cable by adding a small amount, and bromine compounds are more preferred since they are easier to obtain at low cost. Using a bromine compound as the flame retardant (C) is preferred, since an optical fiber cable that tends to drip otherwise during combustion can achieve enhanced self-extinguishing properties, and it is easier for the cable to pass the UL 1581 VW-1 flame test.

Examples of a bromine compound are tetrabromobisphenol A, tribromophenol, decabromodiphenyl ether, bis(pentabromophenyl)ethane, brominated epoxy resin, end-capped brominated epoxy resin, brominated styrene resin, and the like. Those may be used alone or in combination thereof. Among those bromine compounds, brominated epoxy resin, end-capped brominated epoxy resin and brominated styrene resin are preferred, since a bromine compound seldom migrates into the optical fiber and is less likely to bleed out from the optical fiber cable. Also, end-capped brominated epoxy resin is more preferred, since it disperses well. Examples of brominated epoxy resin and end-capped brominated epoxy resin include oligomers.

In 100 mass % of a jacket layer, the content of a flame retardant (C) is preferred to be 5~40 mass %, more preferably 10~30 mass %. When the content of a flame retardant (C) in a jacket layer is at least 5 mass %, an optical fiber cable with excellent flame retardancy is obtained. When the content of a flame retardant (C) in a jacket layer is no greater than 40 mass %, the original properties of the jacket layer will not be impaired.

(Flame Retardant Promoter (D))

When a jacket layer related to the present invention contains a flame retardant (C), the jacket layer is preferred to further contain a flame retardant promoter (D). When combined with a flame retardant (C), a flame retardant promoter (D) can further enhance flame retardancy properties. Thus, the flame retardancy of an optical fiber cable is further enhanced when a flame retardant promoter (D) is contained in the jacket layer.

Examples of a flame retardant promoter (D) that interacts with a halogen-based flame retardant are antimony trioxides, borate compounds, inorganic metal hydrates, silicon compounds, and the like.

Examples of a borate compound are zinc borate, calcium borate, aluminum borate and the like. Examples of an inorganic metal hydrate are magnesium hydroxide, aluminum hydroxide and the like. Examples of a silicon compound are polydimethylsiloxane and resins in which part of the methyl group of polydimethyl siloxane is substituted with a hydrogen atom or with at least one functional group selected from among a phenyl group, halogenated phenyl group, halogenated alkyl group, fluoroester group and the like.

Those flame retardant promoters (D) may be used alone or in combination thereof. Among them, antimony trioxide, zinc borate, and magnesium hydroxide are preferred because they interact with a bromide compound and provide excellent flame retardancy for an optical fiber cable when only a small amount is added. It is more preferred to combine antimony trioxide and zinc borate, since such combined agents can reduce smoke during combustion.

In 100 mass % of a jacket layer, the content of a flame retardant promoter (D) is preferred to be 1~20 mass %, more preferably 5~15 mass %. When the content of a flame retardant promoter (D) in a jacket layer is at least 1 mass %, the flame retardancy of the optical fiber cable is excellent. When the content of a flame retardant promoter (D) in a jacket layer is no greater than 20 mass %, the original properties of the jacket layer will not be impaired.

(Thermal Stabilizer (E))

The jacket layer related to the present invention may further contain a thermal stabilizer (E) if applicable. When chlorinated polyolefin resin (A) is under high temperature conditions, chlorine and hydrogen in the molecule tend to be eliminated to generate hydrogen chloride. A thermal stabilizer (E) suppresses generation of hydrogen chloride from chlorinated polyolefin (A) when heat is applied during the molding process of a jacket layer or the like. Therefore, when a jacket layer contains a thermal stabilizer (E), long-term heat resistance of the optical fiber cable is further enhanced.

Examples of a thermal stabilizer (E) are metal thermal stabilizers such as calcium/zinc thermal stabilizers, barium/zinc thermal stabilizers, magnesium/zinc thermal stabilizers, tin thermal stabilizers, and calcium/magnesium/zinc thermal stabilizers. Those thermal stabilizers (E) may be used alone or in combination thereof. Among them, metal thermal stabilizers are preferred, more preferably calcium/magnesium/zinc thermal stabilizers, because their excellent thermal stabilizing properties provide excellent long-term heat resistance for optical fiber cables.

In 100 mass % of a jacket layer, the content of a thermal stabilizer (E) is preferred to be 1~15 mass %, more preferably 2~10 mass %. When the content of a thermal stabilizer (E) in a jacket layer is at least 1 mass %, the long-term heat resistance of the optical fiber cable is excellent. When the content of a thermal stabilizer (E) in a jacket layer is no greater than 15 mass %, the original properties of the jacket layer will not be impaired.

(Antioxidant (F))

A jacket layer related to the present invention may further contain an antioxidant (F) if applicable. Since an antioxidant (F) suppresses degradation of the resin caused by oxidation, when a jacket layer contains an antioxidant (F), long-term heat resistance of optical fiber cables is further enhanced.

Phenolic antioxidants, sulfuric antioxidants and the like may be used as an antioxidant (F). Examples of phenolic antioxidants are hindered phenolic compounds such as N,N'-(1,6-hexanediyl)bis[3,5-bis(1,1-dimethylethyl) -4-hydroxy-benzene propanamide], pentaerythritol tetrakis[3-[3,5-di(t-butyl)-4-hydroxyphenyl]propionate], 2,2-thio[diethylbis-3-(3,5-di-t-butyl-4-hydroxyphenyl)propionate], 3-(3,5-di-t-butyl-4-hydroxyphenyl)propionic acid octadecyl, 4,4', 4"-[(2,4,6-trimethylbenzene-1,3,5-triy)tris(methylene)]tris(2,6-di-t-butylphenol), bis(3-t-butyl-4-hydroxy-5-methyl benzenepropanoic acid)ethylenebis(oxyethylene), 1,3,5 -tris (3,5-di -t-butyl-4-hydroxybenzyl)isocyanurate, and 3,9-bis [2-[3 -(3 -t-butyl-4-hydroxy-S-methylphenyl)propionyl oxy]-1,1 -dimethylethyl]-2,4,8,10-tetraoxaspiro(5 ,5)undecane.

Those antioxidants (F) may be used alone or in combination thereof. Among those listed above, the following are preferred since they disperse well, their molecular weight is high, they are less likely to migrate into the optical fiber, and they are also less likely to bleed out of the optical fiber cable: N,N'-(1,6-hexanediyl)bis[3,5-bis(1,1-dimethylethyl) -4-hydroxy-benzene propanamide], pentaerythritol tetrakis[3-[3, 5-di(t-butyl)-4-hydroxyphenyl]propionate], and 3,9-bis[2-[3-(3-t-butyl-4-hydroxy-S-methylphenyl)propionyl oxy]-1, 1-dimethylethyl]-2,4,8,10-tetraoxaspiro(5,5)undecane.

More preferred is 3,9-bis[2-[3-(3-t-butyl-4-hydroxy-S-methylphenyl)propionyl oxy]-1,1-dimethylethyl]-2,4,8,10-tetraoxaspiro(5,5)undecane.

In 100 mass % of a jacket layer, the content of an antioxidant (F) is preferred to be 0.01~5 mass %, more preferably 0.1~3 mass %. When the content of an antioxidant (F) in a jacket layer is at least 0.01 mass %, the long-term heat resistance of the optical fiber cable is excellent. When the content of an antioxidant (F) in a jacket layer is no greater than 5 mass %, the original properties of the jacket layer will not be impaired.

(Lubricant (G))

The jacket layer related to the present invention may further contain a lubricant (G) if applicable. Since a lubricant (G) provides fluidity during a thermal molding process, when a jacket layer contains a lubricant (G), the moldability of the material for forming a jacket layer is further enhanced.

Examples of a lubricant (G) are metal soaps such as stearic acid salts, aliphatic hydrocarbon lubricants such as polyethylene wax, liquid paraffin and the like. Examples of stearic acid salts are magnesium stearate, calcium stearate, barium stearate, zinc stearate and the like.

Those lubricants (G) above may be used alone or in combination thereof. Among them, stearic acid salts are preferred, more preferably magnesium stearate and calcium stearate, since they adjust well to the kneading temperature of chlorinated polyolefin resin (A).

In 100 mass % of a jacket layer, the content of a lubricant (G) is preferred to be 0.01~5 mass %, more preferably 0.1~3 mass %. When the content of a lubricant (G) in a jacket layer is at least 0.01 mass %, the moldability of the material for forming a jacket layer is excellent. When the content of a lubricant (G) in a jacket layer is no greater than 5 mass %, the original properties of the jacket layer will not be impaired.

(Pigment (H))

A jacket layer related to the present invention may further contain a pigment (H) if applicable. Since a pigment (H) provides color for a jacket layer, when the jacket layer contains a pigment (H), the identification and design features of an optical fiber cable are improved.

An inorganic or organic pigment, for example, may be used as a pigment (H). More specific examples are: carbon blacks as black pigments; titanium oxides and zinc oxides as white pigments; azo-based organic pigments, lead yellows, chrome yellows, and zinc yellows as yellow pigments; ultramarine blues and cobalt blues as blue pigments; and chromium oxides as green pigments. Those pigments (H) may be used alone or in combination thereof.

In 100 mass % of a jacket layer, the content of a pigment (H) is preferred to be 0.1~10 mass %, more preferably 0.5~7 mass %. When the content of a pigment (H) in a jacket layer is at least 0.1 mass %, excellent identification and design features are achieved for an optical fiber cable. When the content of a pigment (H) in a jacket layer is no greater than 10 mass %, the original properties of the jacket layer will not be impaired.

(Melt tension Improver (J))

A jacket layer related to the present invention is preferred to further contain a melt tension improver (J). A melt tension improver in the present invention indicates an additive capable of improving the tension when chlorinated polyolefin resin (A) and polyolefin resin (B) are melted. Since a melt tension improver (J) is capable of improving the tension when chlorinated polyolefin resin (A) and polyolefin resin (B) are melted, adding a melt tension improver (J) to a jacket layer further improves the melt tension of the jacket layer.

A melt tension is the value measured by using a capillary rheometer.

Examples of a melt tension improver (J) are acrylic resin-based melt tension improvers such as high-molecular weight acrylic resins, fluororesin-based melt tension improvers such as acrylic-modified polytetrafluoroethylenes, silicone-based melt tension improvers such as acryl-modified organopolysiloxane, and the like. Those melt tension improvers (J) may be used alone or in combination thereof. Among them, acrylic resin-based and fluororesin-based melt tension improvers are preferred, since they are capable of providing flame retardancy properties for an optical fiber cable and are especially capable of suppressing dripping during combustion. Even more preferred are acrylic resin-based melt tension improvers, since they disperse well into chlorinated polyolefin resin (A) and polyolefin resin (B).

The number-average molecular weight of an acrylic resin-based melt tension improver is preferred to be 300000~8000000, more preferably 500000~6000000. When the number-average molecular weight of an acrylic resin-based melt tension improver is at least 300000, the molecular main chains of chlorinated polyolefin resin (A) and polyolefin resin (B) intertwine with the molecular main chains of the acrylic resin-based melt tension improver, thereby improving the melt tension of the jacket layer. When the number-average molecular weight of an acrylic resin-based melt tension improver is no greater than 8000000, the original properties of the jacket layer will not be impaired.

The number-average molecular weight of an acrylic resin-based melt tension improver is the value measured by gel permeation chromatography (GPC) using standard polystyrene as a reference sample.

The number-average molecular weight of a fluororesin-based melt tension improver is preferred to be 1000000~30000000, more preferably 3000000~20000000. When the number-average molecular weight of a fluororesin-based melt tension improver is at least 1000000, the molecular main chains of chlorinated polyolefin resin (A) and polyolefin resin (B) intertwine with the fibrillated fluororesin of the fluororesin-based melt tension improver, and the melt tension of the jacket layer is thereby improved. When the number-average molecular weight of a fluororesin-based melt tension improver is no greater than 30000000, the original properties of the jacket layer will not be impaired.

The dynamic viscoelasticity of a fluororesin-based melt tension improver is measured when it is melted at 380° C., and the number-average molecular weight is the value calculated from the measured dynamic viscoelasticity.

In 100 mass % of a jacket layer, the content of a melt tension improver (J) is preferred to be 0.5~20 mass %, more preferably 1~15 mass %. When the content of a melt tension improver (J) in a jacket layer is at least 0.5 mass %, the optical fiber cable exhibits excellent flame retardancy, while dripping during combustion is especially suppressed. When the content of a melt tension improver (J) in a jacket layer is no greater than 20 mass %, the original properties of the jacket layer will not be impaired.

(Other Additives (I))

A jacket layer related to the present invention may include other additives (I) in addition to containing (A)~(H) and (J) described above.

Examples of other additives (I) are fillers to be added to a jacket layer for lowering the cost of an optical fiber cable; anti-blocking agents to be added for preventing optical fiber cables from adhering to each other during extended storage periods of optical fiber cables; nucleating agents to be added for promoting crystallization of polyolefin resin (B) so as to increase the rigidity of the jacket layer; and so forth. Those other additives may be used alone or in combination thereof.

In 100 mass % of a jacket layer, the content of other additives (I) is preferred to be no greater than 30 mass %, more preferably no greater than 20 mass %, since the original properties of the jacket layer are not impaired at such a content. The lower limit of the content is not limited specifically, but may be set at 1 mass % or greater, for example.

(Method for Producing Jacket Layer)

A resin composition as the material for a jacket layer is prepared by mixing chlorinated polyolefin resin (A) and polyolefin resin (B), and mixing in the following if applicable: flame retardant (C), flame retardant promoter (D), thermal stabilizer (E), antioxidant (F), lubricant (G), pigment (H), melt tension improver (J) and other additives (I).

The resin composition may be mixed, for example, by a melt-kneading method using an apparatus such as a twin-screw extruder. As for melt-kneading the material, for example, there are apparatuses available such as a side-feeding twin-screw extruder, in which a feeder for supplying additives is equipped between the main-material supply hopper and the extruder so that additives are directly fed into the extruder; and a vented twin-screw extruder equipped with a device for devolatilizing moisture, residual monomers and the like during extrusion.

The temperature for melt kneading is preferred to be 150~190° C., more preferably 160~180° C., so that the resin composition is suppressed from melting to generate hydrogen chloride from chlorinated polyolefin resin (A).

As for a method for forming a jacket layer on the periphery of an optical fiber, an optical fiber may be coated with a resin composition by using an extrusion coating apparatus equipped with a crosshead die, for example. Especially, when a jacket layer is formed on a plastic optical fiber, it is preferred to coat the resin composition by using an extrusion coating apparatus equipped with a crosshead die because an optical fiber cable with a uniform diameter is achieved. When two or more jacket layers are formed, it is an option to coat one layer at a time, or to coat multiple layers all at once.

When a jacket layer is formed on the periphery of an optical fiber, the temperature for extruding a resin composition is preferred to be 150~200° C., more preferably 160~190° C. When a jacket layer is formed on the periphery of an optical fiber, if the temperature for extruding a resin composition is at least 150° C., the resin composition is homogeneously melted and the extrusion stability is excellent. When a jacket layer is formed on the periphery of an optical fiber, if the temperature for extruding a resin composition is no higher than 200° C., hydrogen chloride is suppressed from being generated from chlorinated polyolefin resin (A).

The thickness of a jacket layer is preferred to be 0.1~2.5 mm, more preferably 0.2~2 mm, even more preferably 0.3~1.5 mm, because excellent flame retardancy, long-term heat resistance and processability are achieved in the optical fiber cable.

The diameter of an optical fiber cable is preferred to be 0.3~10 mm, more preferably 0.6~8.5 mm, even more preferably 0.9~7 mm, because excellent flame retardancy, long-term heat resistance and processability are achieved.

The flexural modulus of an optical fiber cable is preferred to be 3~10 N, more preferably 4~8 N. When the flexural modulus of an optical fiber cable is at least 3N, the rigidity of the optical fiber cable is sufficient for the optical fiber cable to be laid out or arranged between devices without work efficiency being hampered. When the flexural modulus of an optical fiber cable is no greater than 10N, the rigidity of the optical fiber cable is not excessive, and it is easier to bend the cable for installation.

The flexural modulus of an optical fiber cable is the value obtained by conducting a three-point bending test on the optical fiber cable (a load is applied on the center of the cable with both ends free-supported) in accordance with International Organization for Standardization (ISO) 178.

The number of times an optical fiber cable is bent is preferred to be 10000~100000, more preferably 30000~70000. When the number of repeated bendings of an optical fiber cable is at least 10000, the mechanical characteristics of the optical fiber cable are excellent. When the number of repeated bendings of an optical fiber cable is no greater than 100000, the original properties of the optical fiber cable are not impaired.

The number of times an optical fiber cable is bent is the value measured by conducting repeated bending tests in accordance with IEC 60794-1:1993.

Figure 3:
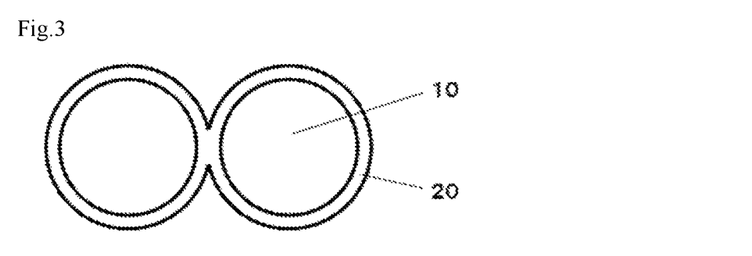
FIG. 3 schematically shows a cross-sectional view of an optical fiber cable related to the present invention.

Another embodiment of an optical fiber cable may be that shown in FIG. 3, where one jacket layer 10 is formed around two optical fibers 10. An optical fiber cable as shown in FIG. 3, for example, may be produced by employing a method in which optical fibers are passed through a crosshead die equipped with a double-core dice nipple, for example.

Usually, when an optical fiber cable is used for communication applications, one end of the optical fiber cable is connected to a light-source system, and the other end is connected to a light-receiving system. To perform bidirectional communication, it is preferred to use an optical fiber cable having two optical fibers as shown in FIG. 3.

The optical fiber cable related to the present invention exhibits excellent long-term heat resistance and excellent mechanical characteristics along with excellent flame retardancy that passes UL 1581 VW-1. Thus, it is suitable for use as a sensor, for communication applications in a mobile medium, for external and internal wiring in a device, and the like. In particular, since the optical fiber cable of the present invention has optimum flexural modulus, which makes wiring easier, it is suitable for use as a sensor, especially for industrial sensor applications.

[Sensor]

A sensor related to the present invention includes the optical fiber cable related to the present invention. Since the sensor includes an optical fiber cable with excellent flame retardancy, long-term heat resistance and mechanical characteristics as described above, flame propagation in the event of fire is suppressed. Thus, a sensor of the present invention is especially suitable for use as an industrial sensor that requires long-term heat resistance and mechanical characteristics. Specific examples of industrial sensors are a photoelectric sensor where LED light is transmitted through the object for a receiving unit to detect a change in light intensity; a fiber-optic strain sensor where an optical fiber cable is installed in a device or structure so as to continuously measure the strain caused by external disturbances; and the like.

EXAMPLES

In the following, the present invention is described in detail by referring to the examples. However, the present invention is not limited to the examples below.

(Flame Retardancy Test)

On each of the optical fiber cables prepared in Examples and Comparative Examples, fire testing was conducted as follows in accordance with UL 1581 VW-1 (vertical flame test on a single cable). An optical fiber cable was set on fire five times for 15 seconds each time. When no spread of flames caused by dripping from the burning cable was observed on a 10-cm square piece of surgical cotton wool laid underneath, or even when the optical fiber cable caught fire, if the flame went out within 60 seconds, the cable was confirmed to have passed the test. The fire test was repeated 10 times, and the number of tests with passing results was confirmed.

(Long-Term Heat Resistance Test)

On each of the optical fiber cables prepared in Examples and Comparative Examples, transmission loss (dB/km) was measured before and after conditions A~C below through a 25 m-1 m cutback method conducted by using light with a wavelength of 650 nm, and by setting a numerical aperture (NA) of 0.1 for the light to enter.

Conditions A: exposed for 3000 hours at a temperature of 85° C. and relative humidity of 10% or lower Conditions B: exposed for 1000 hours at a temperature of 105° C. and relative humidity of 10% or lower Conditions C: exposed for 1000 hours at a temperature of 85° C. and relative humidity of 95%

Measurement through a 25 m-1m cutback method was conducted in accordance with IEC 60793-1-40:2001. In particular, a 25 m-long optical fiber cable was set in a measuring device and its output power $P_2$ was measured. Then, the optical fiber cable was cut into a cutback length (1 m from the end where light enters) and its output power $P_1$ was measured. Transmission loss of light was calculated by using the following formula (1).

[mathematical formula 1]

$$\text{transmission loss (dB/km)} = \frac{10 \times \log(P_1/P_2)}{0.025 - 0.001} \quad (1)$$

(Mechanical Characteristics Test)

(1) Number of Repeated Bendings

On each of the optical fiber cables prepared in Examples and Comparative Examples, the number of repeated bendings was measured as follows in accordance with IEC 60794-1:1993. An optical fiber cable was placed on a repeated bending test machine (model name "Optical Fiber Flexing Tester with Thermostatic Bath" made by Yasuda Seiki Seisakusho, Ltd.), and the cable was bent at 90 degrees on both sides relative to a vertical direction while a load of 500 grams was applied. The test was finished when an increase of 1 dB in transmission loss from the initial value was observed. The number of repeated bendings was confirmed at the time of test completion.

(2) Flexural Modulus

On each of the optical fiber cables prepared in Examples and Comparative Examples, a three-point bending test (a load is applied on the center of the optical fiber cable with both ends free-supported) was conducted as follows in accordance with ISO 178. Both ends of a 100 mm-long optical fiber cable were fixed to a support table, and a load was applied to the center of the cable supported by the support table so as to bend the cable at a rate of 5 mm/min, and the force exerted on the POF cable was measured during the test. When the optical fiber cable showed a displacement of 1 mm, the force at that time was determined to be its flexural modulus (N).

(3) Resin Breaking Strength, Resin Elongation at Break

Using the optical fiber cables obtained in Examples and Comparative Examples, in accordance with testing of resin properties of thermoplastic chlorinated polyethylene among evaluation standards described in UL 1581, a resin tube was formed from an optical fiber cable for evaluation purposes. In particular, the optical fiber cable was cut into a 20 mm-long sample piece, from which optical fiber was pulled out using pliers, and a 0.6 mm-thick resin tube was obtained. The resin tube was set on a tensile testing machine, Autograph "AG-1" (product name, made by Shimadzu Corporation), and was stretched at a rate of 500 mm/min. until the tube broke, to determine the resin breaking strength (N) and resin elongation at break (%).
(Material)
- Chlorinated polyolefin resin (A-1): chlorinated high-density polyethylene with a chlorination rate of 25 mass %
- Chlorinated polyolefin resin (A-2): chlorinated high-density polyethylene with a chlorination rate of 35 mass %
- Chlorinated polyolefin resin (A-3): chlorinated straight-chain low-density polyethylene with a chlorination rate of 35 mass %
- Polyolefin resin (B-1): product name "Novatech HD HY540" (high-density polyethylene, made by Japan Polyethylene Corporation)
- Polyolefin resin (B-2): product name "Novatech LL UE320" (straight-chain low-density polyethylene, made by Japan Polyethylene Corporation)
- Flame retardant (C-1): product name "F-2100" (brominated epoxy resin, made by ICL Japan Ltd.)
- Flame retardant (C-2): product name "F-3014" (end-capped brominated epoxy resin, made by ICL Japan Ltd.)
- Flame retardant (C-3): product name "HP-3010" (brominated styrene resin, made by Albemarle Japan Ltd.)
- Flame retardant promoter (D-1): product name "HIROMASTER C-380" (pellets, antimony trioxide: polyethylene=80:20 (mass %), made by Suzuhiro Chemical Co., Ltd.)
- Flame retardant promoter (D-2): product name "ADK STAB 2335" (zinc borate, made by Adeka Corporation)
- Thermal stabilizer (E-1): product name "ADK STAB RUP-103" (calcium/magnesium/zinc thermal stabilizer, made by Adeka)
- Antioxidant (F-1): product name "ADK STAB AO-80" (phenolic antioxidant, made by Adeka)
- Lubricant (G-1): product name "SC-100" (calcium stearate, made by Sakai Chemical Industry Co., Ltd.)
- Pigment (H-1): product name "Mitsubishi Carbon Black general purpose grade #45" (carbon black, made by Mitsubishi Chemical Corporation)
- Other additive (I-1): product name "Hakuenka CCR-B" (calcium carbonate, made by Shiraishi Kogyo Kaisha, Ltd.)
- Melt tension improver (J-1): product name "METABLEN P-1050" (high molecular weight acrylic resin, made by Mitsubishi Rayon Co., Ltd.)
- Melt tension improver (J-2): product name "METABLEN A-3750" (acrylic-modified polytetrafluoroethylene, made by Mitsubishi Rayon)

(Optical Fiber)

Polymethyl methacrylate (refractive index: 1.492) was used as a core material. The material for the first cladding (inner cladding) was 2-(perfluorooctyl)ethyl methacrylate/ 2,2,2-trifluoroethyl methacrylate/methyl methacrylate/methacrylic acid copolymer (2-(perfluorooctyl)ethyl methacrylate unit: 2,2,2-trifluoroethyl methacrylate unit: methyl methacrylate unit: methacrylic acid unit=31: 51: 17: 1 (mass %), refractive index of 1.402). The material for the second cladding (outer cladding) was vinylidene fluoride/tetrafluoroethylene/hexafluoroethylene copolymer (vinylidene fluoride unit: tetrafluoroethylene unit: hexafluoroethylene unit=48: 43: 9 (mass %), refractive index of 1.374). The material was spun using a triple-layered concentric conjugated spinning nozzle, which was stretched to be twice as long in a fiber axial direction in a 140° C. hot air oven. Accordingly, an optical fiber was obtained; the first cladding was 5 μm thick, the second cladding was 10 μm thick, and the fiber diameter was 1.0 mm. The prepared optical fiber was used as the optical fiber in each of the Examples and Comparative Examples.

Example 1

A resin composition was prepared using the following materials, and the composition was melt-kneaded at 170° C. using a twin-screw extruder (model name "BT-40", made by Research Laboratory of Plastics Technology Co., Ltd.): 36 mass % of chlorinated polyolefin resin (A-1), 25 mass % of polyolefin resin (B-1), 21 mass % of flame retardant (C-1), 6 mass % of flame retardant promoter (D-1), 3 mass % of flame retardant promoter (D-2), 5 mass % of thermal stabilizer (E-1), 1.5 mass % of antioxidant (F-1), 1.5 mass % of lubricant (G-1), and 1 mass % of pigment (H-1).

The resin composition was supplied to a 40 mm-cable coating apparatus equipped with a resin coating crosshead die (made by Hijiri Seisakusho K.K.) so that a 0.6 mm cladding layer was formed on the periphery of the optical fiber. Accordingly, an optical fiber cable with a 2.2 mm diameter was obtained. The above tests were conducted on the optical fiber cable. The evaluation results are shown in Table 2.

Examples 2~13, Comparative Examples 1~6

Optical fiber cables were respectively prepared the same as in Example 1 except that the components of each resin composition were changed as shown in Table 1. The evaluation results are shown in Table 2. The unit of each value in Table 1 is mass %.

TABLE 1

| | (A) | | | (B) | | (J) | | (C) | | | (D) | | (E) | (F) | (G) | (H) | (I) |
|---|---|---|---|---|---|---|---|---|---|---|---|---|---|---|---|---|---|
| | (A-1) | (A-2) | (A-3) | (B-1) | (B-2) | (J-1) | (J-2) | (C-1) | (C-2) | (C-3) | (D-1) | (D-2) | (E-1) | (F-1) | (G-1) | (H-1) | (I-1) |
| Example 1 | 36 | — | — | 25 | — | — | — | 21 | — | — | 6 | 3 | 5 | 1.5 | 1.5 | 1 | — |
| Example 2 | 42 | — | — | 22 | — | — | — | — | 18 | — | 7 | 3 | 5 | 1 | 1 | 1 | — |
| Example 3 | — | — | 36 | — | 32 | — | — | 18 | — | — | 6 | 2 | 3 | 1 | 1 | 1 | — |
| Example 4 | — | 30 | — | — | 32 | — | — | — | — | 22 | 8 | — | 4 | 1 | 2 | 1 | — |
| Example 5 | — | — | 20 | 38 | — | — | — | — | — | 25 | 7 | 3 | 4 | 1 | 1 | 1 | — |
| Example 6 | 30 | — | — | 30 | — | — | — | — | 24 | — | 8 | — | 4 | 1 | 2 | 1 | — |
| Example 7 | 55 | — | — | 15 | — | — | — | 15 | — | — | 4 | — | 7 | 1.5 | 1.5 | 1 | — |
| Example 8 | — | 48 | — | 10 | — | — | — | — | 18 | — | 6 | — | 4 | 1.5 | 1.5 | 1 | 10 |
| Example 9 | 46 | — | — | 20 | — | 6 | — | — | 18 | — | 6 | — | 2 | 0.5 | 0.5 | 1 | — |
| Example 10 | — | — | 44 | — | 22 | — | 6 | — | — | 18 | 6 | — | 2 | 0.5 | 0.5 | 1 | — |
| Example 11 | — | 40 | — | 22 | — | 10 | — | — | 18 | — | 6 | — | 2 | 0.5 | 0.5 | 1 | — |

TABLE 1-continued

| | (A) | | | (B) | | (J) | | (C) | | | (D) | | (E) | (F) | (G) | (H) | (I) |
|---|---|---|---|---|---|---|---|---|---|---|---|---|---|---|---|---|---|
| | (A-1) | (A-2) | (A-3) | (B-1) | (B-2) | (J-1) | (J-2) | (C-1) | (C-2) | (C-3) | (D-1) | (D-2) | (E-1) | (F-1) | (G-1) | (H-1) | (I-1) |
| Example 12 | 33 | — | — | 26 | — | 4 | — | — | 25 | — | 7.5 | — | 2.5 | 0.5 | 0.5 | 1 | — |
| Example 13 | — | 55 | — | — | 14 | — | 5 | 15 | — | — | 7 | — | 2 | 0.5 | 0.5 | 1 | — |
| Comp. Example 1 | — | 50 | — | — | — | — | — | — | — | 20 | 8 | — | 4 | 1 | 1 | 1 | 15 |
| Comp. Example 2 | 52 | — | — | — | — | — | — | — | 16 | — | 5 | — | 4 | 1 | 1 | 1 | 20 |
| Comp. Example 3 | — | — | — | 60 | — | — | — | 24 | — | — | 8 | 2 | 3 | 1 | 1 | 1 | — |
| Comp. Example 4 | 65 | — | — | — | — | — | — | — | 20 | — | 8 | — | 4 | 1 | 1 | 1 | — |
| Comp. Example 5 | 60 | — | — | — | — | 10 | — | — | 15 | — | 8 | — | 4 | 1 | 1 | 1 | — |
| Comp. Example 6 | — | — | — | — | 55 | — | 6 | 24 | — | — | 8 | 1 | 3 | 1 | 1 | 1 | — |

TABLE 2

| | Flame Retardancy Test | Long-term Heat Resistance Test | | | | Mechanical Characteristics Test | | | |
|---|---|---|---|---|---|---|---|---|---|
| | number of tests with passing result (times) | initial value (dB/km) | after condition A (dB/km) | after condition B (dB/km) | after condition C (dB/km) | number of repeated bendings (times) | flexural strength (N) | resin breaking strength (N) | resin elongation at break (%) |
| Example 1 | 10 | 131 | 146 | 183 | 182 | 20000 | 5.5 | 55 | 240 |
| Example 2 | 10 | 133 | 151 | 191 | 188 | 25000 | 5.1 | 48 | 250 |
| Example 3 | 10 | 128 | 149 | 197 | 185 | 25000 | 4.8 | 53 | 240 |
| Example 4 | 10 | 131 | 153 | 187 | 183 | 23000 | 4.9 | 48 | 220 |
| Example 5 | 10 | 136 | 144 | 178 | 178 | 18000 | 7.4 | 52 | 180 |
| Example 6 | 10 | 129 | 145 | 176 | 188 | 21000 | 6.5 | 51 | 210 |
| Example 7 | 10 | 133 | 170 | 271 | 191 | 26000 | 2.9 | 37 | 450 |
| Example 8 | 10 | 135 | 166 | 205 | 254 | 8500 | 3.1 | 42 | 410 |
| Example 9 | 10 | 133 | 158 | 189 | 188 | 39000 | 5.5 | 46 | 610 |
| Example 10 | 10 | 131 | 166 | 191 | 178 | 50000 | 5.2 | 50 | 660 |
| Example 11 | 10 | 134 | 158 | 205 | 177 | 51000 | 5.6 | 49 | 500 |
| Example 12 | 10 | 133 | 169 | 191 | 181 | 52000 | 6.1 | 45 | 570 |
| Example 13 | 10 | 132 | 170 | 223 | 193 | 36000 | 4.6 | 36 | 710 |
| Comp. Example 1 | 10 | 133 | 168 | 211 | 238 | 8000 | 2.4 | 33 | 770 |
| Comp. Example 2 | 10 | 132 | 161 | 236 | 209 | 8000 | 2.5 | 35 | 710 |
| Comp. Example 3 | 6 | 129 | 155 | 188 | 183 | 5000 | 8.1 | 65 | 200 |
| Comp. Example 4 | 6 | 134 | 161 | 271 | 178 | 32000 | 2.9 | 35 | 680 |
| Comp. Example 5 | 10 | 128 | 173 | 342 | 194 | 35000 | 3.3 | 38 | 810 |
| Comp. Example 6 | 7 | 133 | 183 | 201 | 179 | 16000 | 6.6 | 55 | 450 |

Optical fiber cables obtained in Examples 1~13 each exhibited excellent flame retardancy, long-term heat resistance and mechanical characteristics.

By contrast, optical fiber cables prepared without using polyolefin (B) in Comparative Examples 1, 2, 4 and 5 showed lower results in long-term heat resistance and mechanical characteristics. In addition, optical fiber cables prepared without using chlorinated polyolefin resin (A) in Comparative Examples 3 and 6 showed lower results in flame retardancy and mechanical characteristics.

The present application is based upon and claims the benefit of priority to Japanese Patent Application No. 2014-007000, filed on Jan. 17, 2014. The entire contents of the application are incorporated herein by reference.

So far, the present invention has been described with reference to the embodiments and examples. However, the present invention is not limited to those embodiments and examples. Various modifications in the structure and details of the present invention understandable to a person skilled in the art may be made within the scope of the present invention.

INDUSTRIAL APPLICABILITY

The optical fiber cable related to the present invention exhibits excellent long-term heat resistance and excellent mechanical characteristics along with excellent flame retardancy that passes the UL 1581 VW-1 test. Thus, it is suitable for use as a sensor, communication equipment in mobile systems, external and internal wiring in a device, and the like. In particular, since the optical fiber cable of the present invention has optimum flexural modulus, which makes wiring easier, it is suitable for use as a sensor, especially for industrial sensor applications.

DESCRIPTION OF NUMERICAL REFERENCES 10 optical fiber
11 core
12 cladding
12a cladding (first layer)
12b cladding (second layer)
20 jacket layer
20a jacket layer (first layer)
20b jacket layer (second layer)

What is claimed is:

1. An optical fiber cable, comprising:
   an optical fiber; and
   a jacket layer formed on the periphery of the optical fiber, wherein
   the jacket layer comprises a chlorinated polyolefin resin (A), a polyolefin resin (B), and a melt tension improver (J); and
   the optical fiber cable has an increase in transmission loss of less than 1dB after repeated bendings numbering 36,000 to 52,000 when measured by a repeated bending test in accordance with IEC 60794-1:1993.

2. The optical fiber cable according to claim 1, wherein the optical fiber cable has a flexural modulus of 3-10 N when measured by conducting a three-point bending test in accordance with ISO 178.

3. The optical fiber cable according to claim 1, wherein the melt tension improver (J) is at least either an acrylic resin or a fluororesin.

4. The optical fiber cable according to claim 1, wherein the chlorinated polyolefin resin (A) is a chlorinated polyethylene.

5. The optical fiber cable according to claim 1, wherein the polyolefin resin (B) is polyethylene.

6. The optical fiber cable according to claim 1, wherein the jacket layer further comprises a flame retardant (C).

7. The optical fiber cable according to claim 6, wherein the jacket layer further comprises a flame retardant promoter (D).

8. A sensor, comprising the optical fiber cable according to claim 1.

9. The optical fiber cable according to claim 3, wherein the acrylic resin has a number-average molecular weight of 300,000 to 8,000,000.

10. The optical fiber cable according to claim 3, wherein the acrylic resin has a number-average molecular weight of 500,000 to 6,000,000.

11. The optical fiber cable according to claim 3, wherein the fluororesin has a number-average molecular weight of 1,000,000 to 30,000,000.

12. The optical fiber cable according to claim 3, wherein the fluororesin has a number-average molecular weight of 3,000,000 to 20,000,000.

13. The optical fiber cable according to claim 1, wherein the melt tension improver (J) is present in an amount of 0.5-20 mass % of the jacket layer.

14. The optical fiber cable according to claim 1, wherein the melt tension improver (J) is present in an amount of 1-15 mass % of the jacket layer.

15. The optical fiber cable according to claim 1, wherein the chlorinated polyolefin resin (A) is present in an amount of 15-50 mass % of the jacket layer.

16. The optical fiber cable according to claim 1, wherein the chlorinated polyolefin resin (A) is present in an amount of 20-45 mass % of the jacket layer.

* * * * *